(12) United States Patent
Arisi et al.

(10) Patent No.: US 10,844,729 B2
(45) Date of Patent: Nov. 24, 2020

(54) TURBINE VANE FOR GAS TURBINE ENGINE

(71) Applicant: United Technologies Corporation, Farmington, CT (US)

(72) Inventors: Allan N. Arisi, Manchester, CT (US); Bret M. Teller, Meriden, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 77 days.

(21) Appl. No.: 15/946,418

(22) Filed: Apr. 5, 2018

(65) Prior Publication Data

US 2019/0309632 A1    Oct. 10, 2019

(51) Int. Cl.

| | |
|---|---|
| *F01D 5/18* | (2006.01) |
| *B23H 1/00* | (2006.01) |
| *B23H 9/10* | (2006.01) |
| *B23H 9/14* | (2006.01) |

(52) U.S. Cl.
CPC ............... *F01D 5/186* (2013.01); *B23H 1/00* (2013.01); *B23H 9/10* (2013.01); *B23H 9/14* (2013.01); *F05D 2220/3212* (2013.01); *F05D 2230/12* (2013.01); *F05D 2250/74* (2013.01)

(58) Field of Classification Search
CPC .......................... F01D 5/186; F05D 2250/74
See application file for complete search history.

(56) References Cited

U.S. PATENT DOCUMENTS

| | | | |
|---|---|---|---|
| 7,766,618 B1 | 8/2010 | Liang | |
| 8,777,570 B1 | 7/2014 | Liang | |
| 10,392,943 B2* | 8/2019 | Lewis | ...................... F01D 5/186 |
| 2008/0101943 A1* | 5/2008 | Columbus | ............... F01D 5/141 |
| | | | 416/223 R |
| 2014/0010632 A1* | 1/2014 | Spangler | ................. F01D 5/186 |
| | | | 415/115 |
| 2016/0160656 A1* | 6/2016 | Bergman | ................ F01D 9/041 |
| | | | 60/806 |
| 2016/0177735 A1* | 6/2016 | Bradshaw | ............... F01D 5/186 |
| | | | 60/806 |
| 2016/0201473 A1* | 7/2016 | Spangler | ................. F01D 5/186 |
| | | | 60/806 |
| 2018/0230811 A1* | 8/2018 | Lewis | ..................... F01D 5/186 |

* cited by examiner

*Primary Examiner* — David E Sosnowski
*Assistant Examiner* — Hakeem M Abdellaoui
(74) *Attorney, Agent, or Firm* — Cantor Colburn LLP

(57) ABSTRACT

A turbine vane for a gas turbine engine having a plurality of cooling holes defined therein is provided. The plurality of cooling holes provide fluid communication to a surface of the turbine vane, the plurality of cooling holes including holes noted by the following coordinates: TVA, TVB, TVC, TVD and TVE of Table 1.

18 Claims, 8 Drawing Sheets

TURBINE VANE FOR GAS TURBINE ENGINE

BACKGROUND

Exemplary embodiments of the present disclosure relate generally to a vane for a gas turbine engine and, in one embodiment, to a cooling hole distribution suited for use in vanes of a turbine section of the gas turbine engine.

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Both the compressor and turbine sections include rotating blades alternating between stationary vanes. The vanes and rotating blades in the turbine section extend into the flow path of the high-energy exhaust gas flow. All structures within the exhaust gas flow path are exposed to extreme temperatures. A cooling air flow is therefore utilized over some structures to improve durability and performance.

Accordingly, it is desirable to provide adequate cooling to structures of the gas turbine engine.

BRIEF DESCRIPTION

A turbine vane for a gas turbine engine having a plurality of cooling holes defined therein is provided. The plurality of cooling holes provide fluid communication to a surface of the turbine vane, the plurality of cooling holes including holes noted by the following coordinates: TVA, TVB, TVC, TVD and TVE of Table 1.

In addition to one or more of the features described above, or as an alternative to any of the foregoing embodiments and for each hole, external breakout center corresponds to an intersection of a central axis of the cooling hole with an outer surface of the vane.

In addition to one or more of the features described above, or as an alternative to any of the foregoing embodiments, the turbine vane is a first stage turbine vane of a high pressure turbine of a gas turbine engine.

In addition to one or more of the features described above, or as an alternative to any of the foregoing embodiments, the X, Y, Z Cartesian coordinate values of Table 1 have a tolerance of ±0.100 inches of the nominal location with respect to the X, Y and Z axes.

In addition to one or more of the features described above, or as an alternative to any of the foregoing embodiments, the plurality of cooling holes include holes noted by the all of the coordinates of Table 1.

In addition to one or more of the features described above, or as an alternative to any of the foregoing embodiments, the plurality of cooling holes include holes noted by the following coordinates of Table 1: TWA, TWB, TWC, TWD, TWE, TWF and TUA, TUB, TUC and TUD.

In addition to one or more of the features described above, or as an alternative to any of the foregoing embodiments, the turbine vane is a first stage turbine vane of a high pressure turbine of a gas turbine engine.

In addition to one or more of the features described above, or as an alternative to any of the foregoing embodiments, the plurality of cooling holes include holes noted by the following coordinates of Table 1: TWA, TWB, TWC, TWD, TWE, TWF and TUA, TUB, TUC and TUD.

In addition to one or more of the features described above, or as an alternative to any of the foregoing embodiments, the plurality of cooling holes are formed by an electrical discharge machining process.

In addition to one or more of the features described above, or as an alternative to any of the foregoing embodiments, the plurality of cooling holes include holes noted by the following coordinates of Table 1: TWA, TWB, TWC, TWD, TWE, TWF and TUA, TUB, TUC and TUD.

In addition to one or more of the features described above, or as an alternative to any of the foregoing embodiments, the turbine vane is a first stage turbine vane of a high pressure turbine of a gas turbine engine.

In addition to one or more of the features described above, or as an alternative to any of the foregoing embodiments, the plurality of cooling holes include holes noted by the all of the coordinates of Table 1.

In addition to one or more of the features described above, or as an alternative to any of the foregoing embodiments and for each hole, external breakout center corresponds to an intersection of a central axis of the cooling hole with an outer surface of the vane.

Also disclosed is a turbine vane for a gas turbine engine having a plurality of cooling holes defined therein, the plurality of cooling holes providing fluid communication to a surface of the turbine vane, the plurality of cooling holes including holes noted by the following coordinates: TWA, TWB, TWC, TWD, TWE, TWF and TUA, TUB, TUC and TUD of Table 1.

In addition to one or more of the features described above, or as an alternative to any of the foregoing embodiments, the plurality of cooling holes are formed by an electrical discharge machining process.

In addition to one or more of the features described above, or as an alternative to any of the foregoing embodiments, the turbine vane is a first stage turbine vane of a high pressure turbine of a gas turbine engine.

In addition to one or more of the features described above, or as an alternative to any of the foregoing embodiments, the turbine vane is a first stage turbine vane of a high pressure turbine of a gas turbine engine.

Also disclosed is a turbine stator assembly for a gas turbine engine comprising a plurality of vanes, each vane having a plurality of cooling holes defined therein for providing fluid communication to a surface of each vane, the plurality of cooling holes including holes noted by the following coordinates: TVA, TVB, TVC, TVD and TVE of Table 1.

In addition to one or more of the features described above, or as an alternative to any of the foregoing embodiments, the plurality of cooling holes include holes noted by the all of the coordinates of Table 1.

Also disclosed is a method of forming a cooling hole pattern in an exterior surface of a vane used in a high pressure turbine of a gas turbine engine, the method including the steps of: drilling a plurality of cooling holes in the exterior surface of the vane with a single comb electrode using an electrode discharge machining process.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
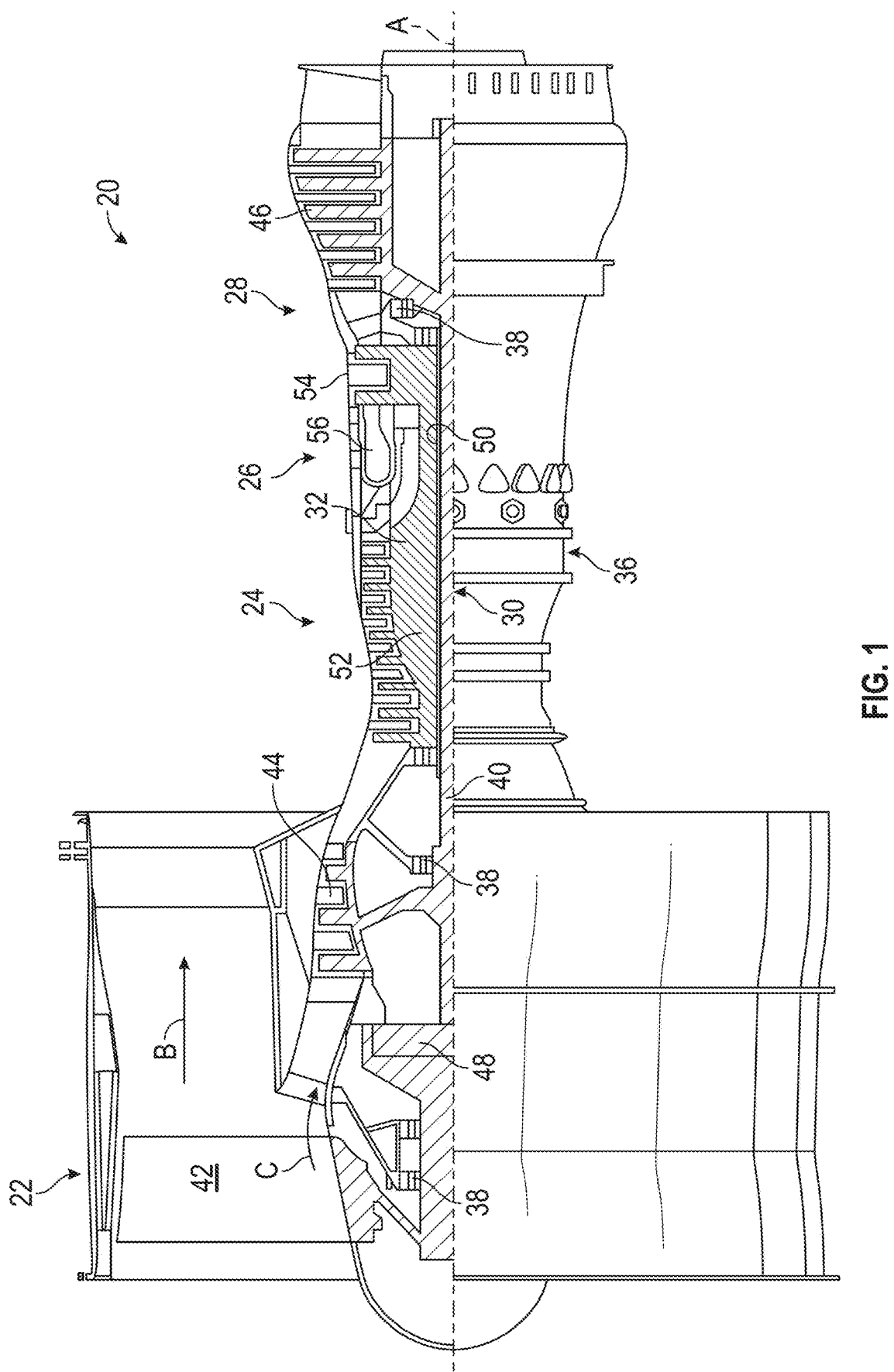
FIG. 1 is a schematic, partial cross-sectional view of a gas turbine engine in accordance with this disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
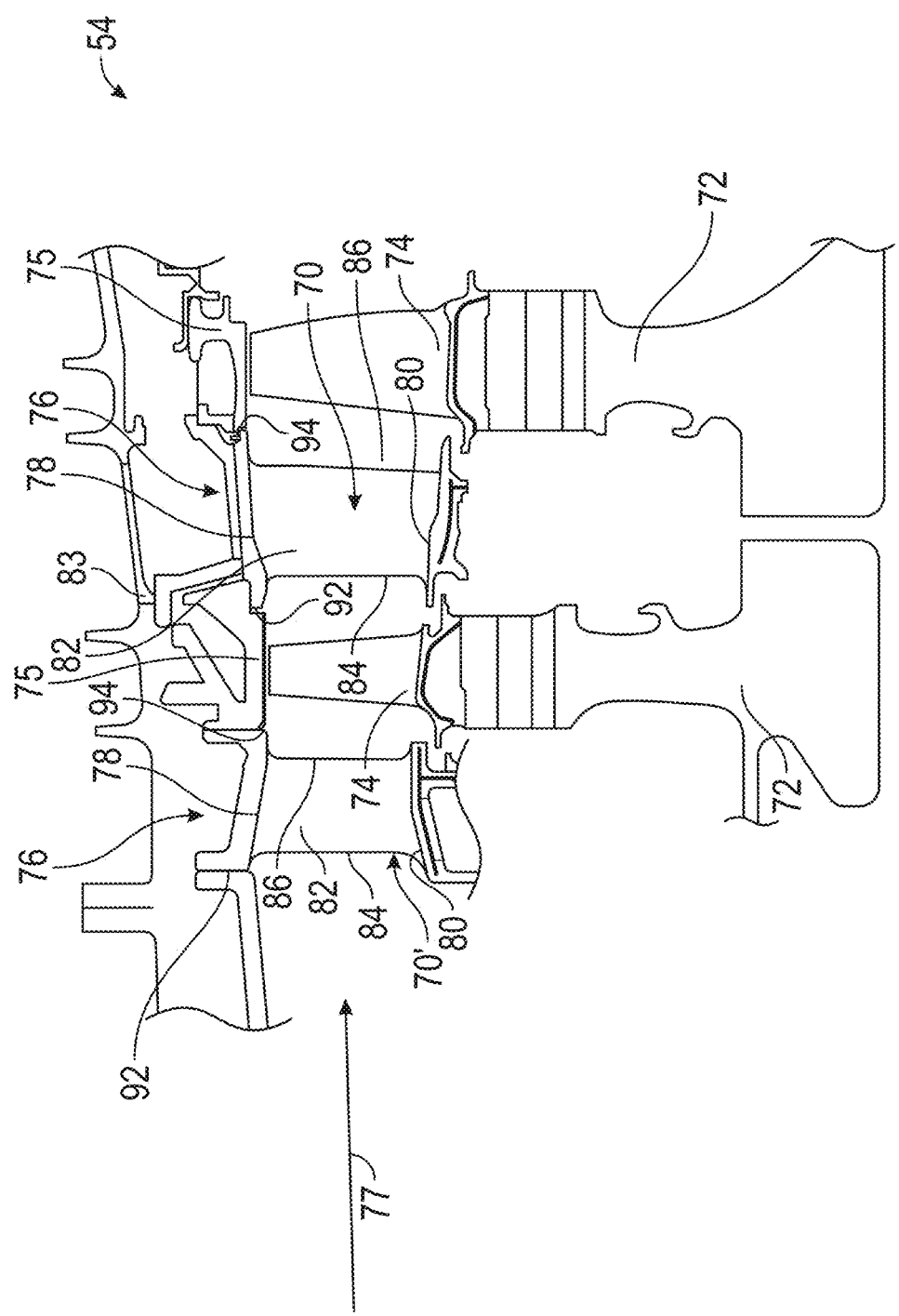
FIG. 2 is a schematic view of a two-stage high pressure turbine of the gas turbine engine.

FIG. 2 illustrates a portion of a high pressure turbine 54. FIG. 2 also illustrates high pressure turbine stage vanes 70 one of which (e.g., a first stage vane 70') is located forward of a first one of a pair of turbine disks 72. As used herein the first stage vane 70' is the first vane of the high pressure turbine section 54 that is located aft of the combustor section 26. Each of the pair of turbine disks having a plurality of turbine blades 74 secured thereto. The turbine blades 74 rotate proximate to a blade outer air seal (BOAS) 75 which is located aft of the vane 70 or first stage vane 70'. The high pressure turbine stage vane 70' is one of a plurality of vanes 70 that are positioned circumferentially about the axis A of the engine in order to provide a stator assembly 76. Hot gases from the combustor section 56 flow through the turbine in the direction of arrow 77. Although a two-stage high pressure turbine is illustrated, other high pressure turbines are considered to be within the scope of various embodiments of the present disclosure.

The high pressure turbine (HPT) 1st vane 70' is subjected to gas temperatures well above the yield capability of its material. In order to mitigate such high temperature detrimental effects, surface film-cooling is typically used to cool the vanes of the HPT. Surface film-cooling is achieved by supplying cooling air from the cold backside through cooling holes drilled on the HPT components. Cooling holes are strategically designed and placed on the vane and turbine components in-order to maximize the cooling effectiveness and minimize the efficiency penalty.

Referring now to at least FIGS. 2-9, each vane 70' has an upper platform or outer diameter platform 78 and a lower platform or inner diameter platform 80 with an airfoil 82 extending therebetween. When secured to an outer housing or turbine case 84 of the engine 20, the upper platform or outer diameter platform 78 is further away from axis A than the lower platform or inner diameter platform 80. In other words, the upper platform 78 is at a further radial distance from the axis A than the lower platform 80.

The airfoil 82 has a leading edge 84 and a trailing edge 86. In addition, the airfoil 82 is provided with an internal cavity or cavities 87 that is/are in fluid communication with a source of cooling air or fluid. The airfoil 82 has a plurality of cooling openings 88 that are in fluid communication with the internal cavity in order to provide a source of cooling fluid or air to portions of the airfoil 82 such that film cooling can be provided in desired locations.

In addition, the upper platform or outer diameter platform 78 is also provided with a plurality of cooling openings 88 that are also in fluid communication with a source of cooling fluid or air, which in one embodiment may be provided by an internal cavity of the platform that is in fluid communication with the source of cooling air or fluid.

Still further, the lower platform or lower diameter platform 80 is also provided with a plurality of cooling openings 88 that are also in fluid communication with a source of cooling fluid or air, which in one embodiment may be provided by an internal cavity of the platform that is in fluid communication with the source of cooling air or fluid.

Referring to at least FIGS. 2-8, the upper platform or outer diameter platform 78 also has a leading edge or forward rail 92, a trailing edge or aft rail 94 and a pair of sides 96 extending therebetween. Each one of the pair of sides 96 abuts another side 96 of an adjacent vane 70 when they are secured to the turbine case 84 to form the stator assembly 76.

Various embodiments of this disclosure relate to a unique cooling hole cooling configuration on the HPT 1st vane 70' in order to maximize on film-cooling at a low turbine efficiency penalty. The cooling holes 88 have been strategically placed on the vane airfoil, platforms and matefaces as illustrated in the accompanying FIGS. and cooling hole coordinates.

Vane cooling holes can be drilled with a laser drilling process. However, laser drilled holes, whether round or shaped, typically result in poor hole quality thereby resulting in limited film cooling effectiveness on the airfoil surfaces. As such, cooling holes using this process limits the benefit of heat transfer from the air flowing through these holes and through the part, and therefore limits the durability of the airfoil.

To improve the airfoil durability, electrical discharge machining (EDM) drilling process is usually preferred for providing the cooling holes 88 in the vane 70'. Unlike laser drilled holes, EDM drilled holes provide a "cleaner and shaper" cooling hole geometry portion 89 (see at least FIG. 5A) that extends to the surface of the airfoil 82, platform 78, 80 or any other surface of the vane 70'. The diffuser portion helps to provide better film cooling and therefore increases the efficiency of the air flowing through the part (e.g., vane 70') as well as improving the durability of the airfoil.

In the present disclosure, the locations of the cooling holes 88 have been strategically placed to not only maximize on film-cooling footprints and hole diffusion (drill depth) but also enable utilization of EDM drill process using comb electrodes. As used herein, comb electrode tools or tooling refers to a single tool with a plurality of electrodes that can simultaneously drill a plurality of cooling openings via an EDM drilling process. The cooling hole pattern has been determined in order to optimize the time required to drill these holes without sacrificing cooling effectiveness. In one embodiment, the airfoil cooling holes 88 are lined up as much as possible to allow a comb electrode tooling to be made for fast manufacturing turnaround time. In other words, an electrode comb is configured to simultaneously drill numerous holes via an EDM drilling process. Also, the patterns (e.g., hole locations) and comb tool can be configured to avoid internal features of the vane 70' such as rib 91. The platform cooling holes 88 are distributed to cover observed distress areas determined by development engine runs, and in accordance with various embodiments of the present disclosure mateface cooling holes have been added to these areas.

The use of EDM shaped holes in a vane and in particular a $1^{st}$ stage vane 70' including the vane airfoil and platforms will improve the durability of the component. Moreover, the cleaner and sharper hole features resulting from EDM drilling process enables better ceramic coat application on the part to reduce heat load to the part. Ceramic thermal barrier coatings are typically applied to high pressure turbine (HPT) components as an insulative barrier from the high temperature gas-stream. The microstructure quality of these ceramic coats is directly impacted by the surface finish on the part. As a result, good ceramic microstructure can be achieved as a byproduct of the EDM drilling process.

In accordance with one embodiment, the vane 70' is configured to have a plurality of cooling openings 88 located on the vane 70 in accordance with the set of Cartesian coordinates provided in Table 1.

This cooling hole pattern has the following unique characteristics, which in accordance with various embodiments of the present disclosure may be used exclusively or together or in any combination thereof.

In one implementation, five (5) cooling holes are placed on an aft rail or trailing edge 94 of the upper platform or outer diameter platform 78. These cooling holes 88 serve to cool the first vane 70' to BOAS 75 interface region as illustrated in at least FIG. 2. This region of the vane has shown elevated temperatures and these holes serve to cool the platform primarily using conduction and the downstream blade outer air-seal convectively. These five holes are identified as holes TVA, TVB, TVC, TVD and TVE in Table 1.

Figure 6:
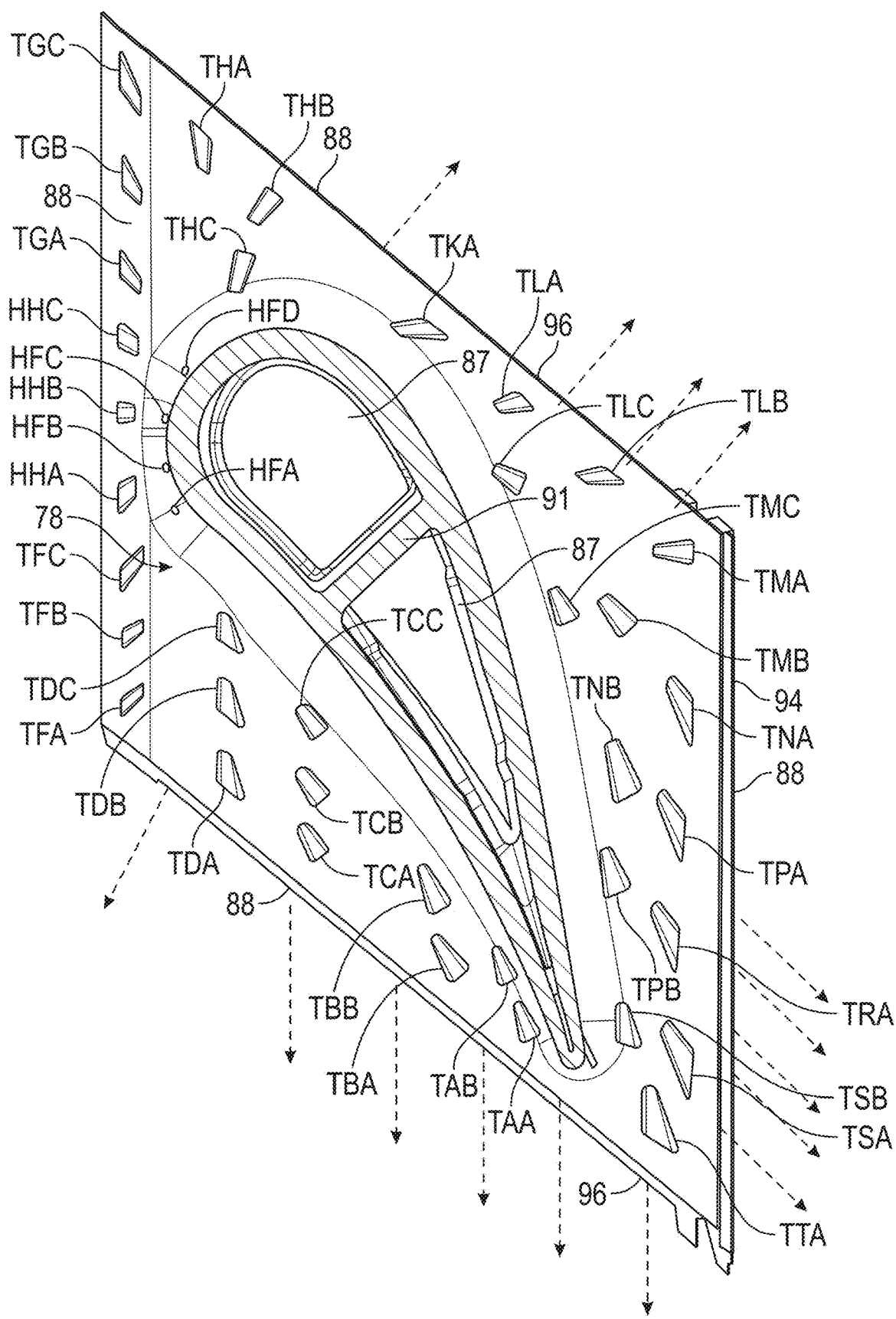
FIG. 6 is a view along lines 6-6 of FIG. 3.
Figure 7:
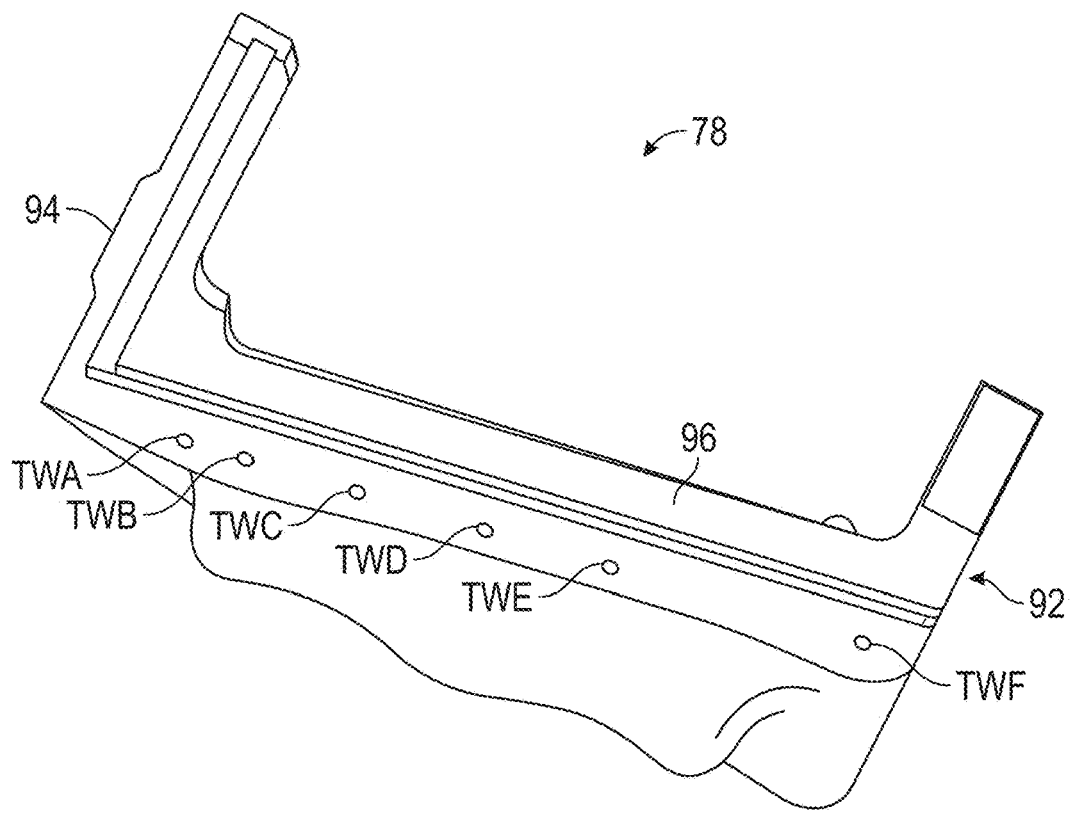
FIGS. 7 and 8 are perspective views illustrating portions of the vane illustrated in FIG. 3.
Figure 8:
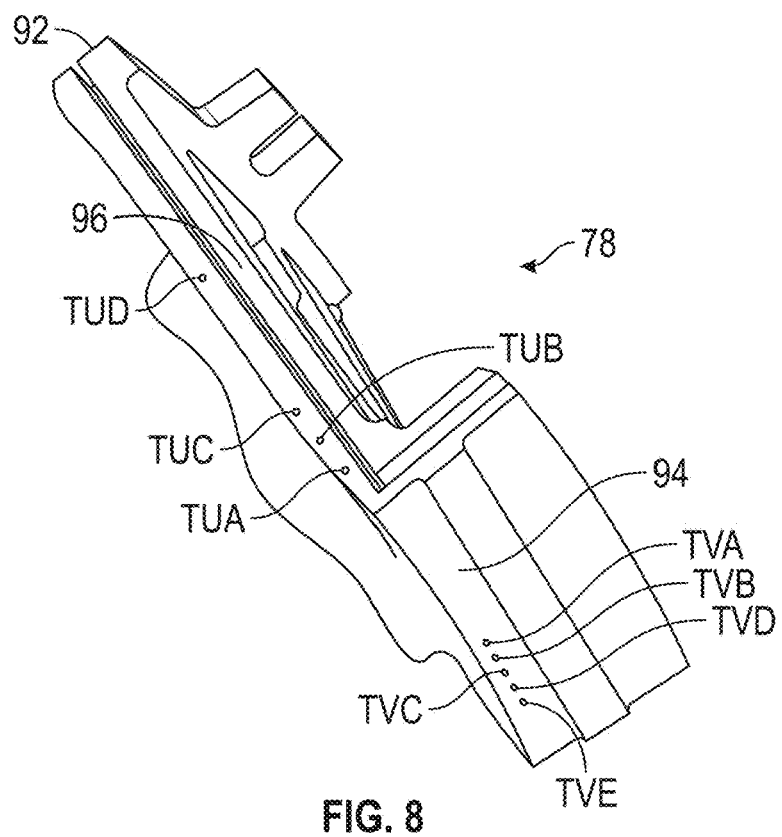
Figure 9:
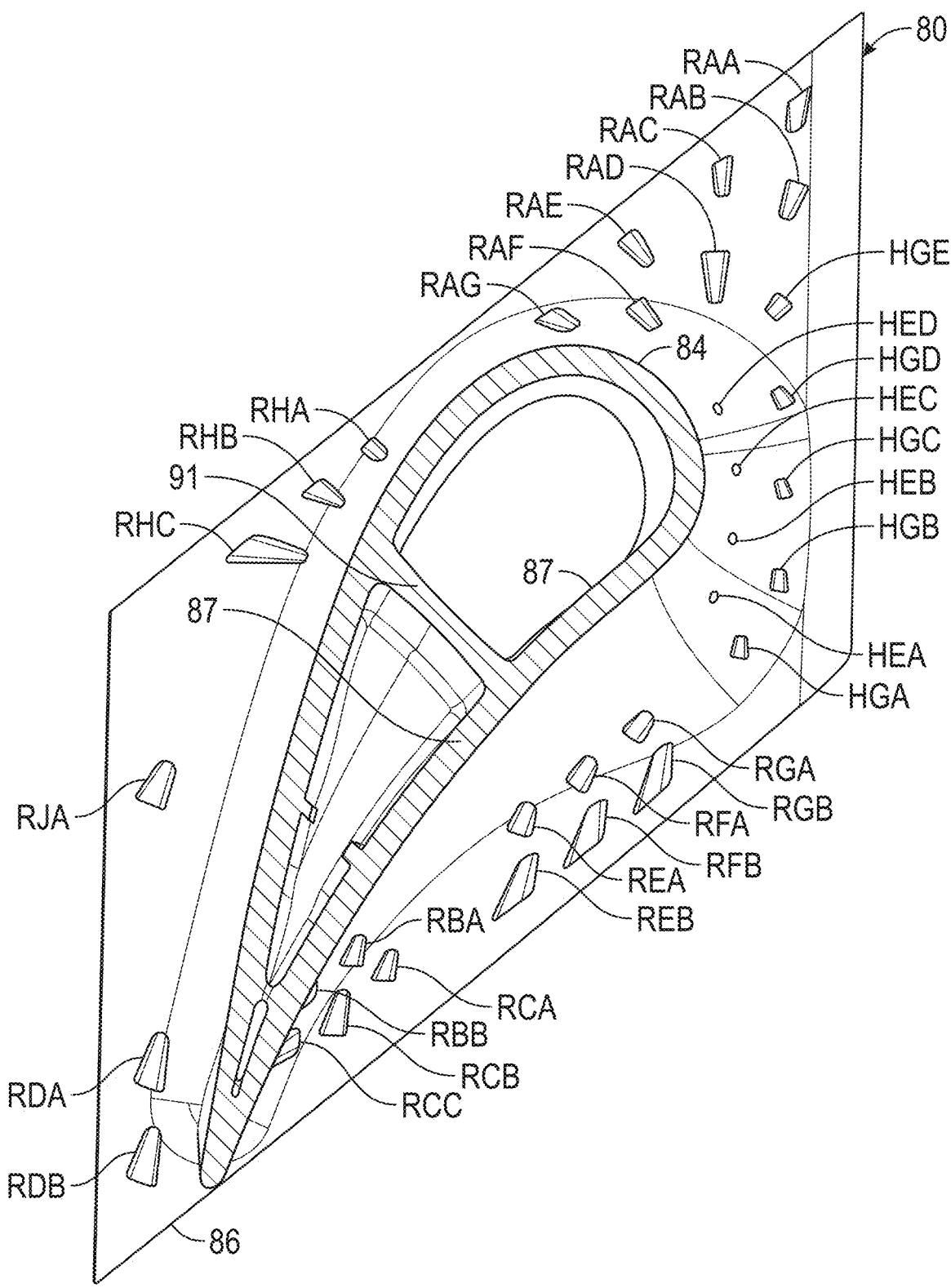
FIG. 9 is a view along lines 9-9 of FIG. 3.

As such and in one embodiment and referring to at least FIGS. 6-8, the upper platform or outer diameter platform 78 of the vane 70' has at least the following openings 88 in the locations noted by the following coordinates; TVA, TVB, TVC, TVD and TVE.

In addition, ten (10) mateface cooling holes are optimally placed to limit distress around the vane platform edges 96 of the upper platform or upper diameter platform 78. These ten holes are identified as holes TWA, TWB, TWC, TWD, TWE, TWF and TUA, TUB, TUC and TUD in Table 1 are illustrated in at least FIGS. 6-8.

As such and in one embodiment and referring to at least FIGS. 6-8, the upper platform or outer diameter platform 78 of the vane 70' has at least the following openings 88 in the locations noted by the following coordinates; TWA, TWB, TWC, TWD, TWE, TWF and TUA, TUB, TUC and TUD.

Still further and in one embodiment, and referring to at least FIGS. 6-8, the upper platform or outer diameter platform 78 of the vane 70' has at least the following openings 88 in the locations noted by the following coordinates; TWA, TWB, TWC, TWD, TWE, TWF, TUA, TUB, TUC, TUD, TVA, TVB, TVC, TVD and TVE.

In addition, the cooling hole pattern on the airfoil pressure side and suction side are arranged to allow for EDM combs to be used during manufacturing hole drilling. This includes separated combs and/or interlaced comb patterns as shown in the attached FIGS. The use of an EDM comb(s) allows associated cost of fabricating the part to be reduced as it eliminates the need or usage of a single point EDM process.

FIGS. 3, 4A, 4B, 5 and 5A are perspective views illustrating the pressure side of the airfoil 82. As illustrated in the attached FIGS., herringbone locations on the airfoil pressure side and suction side have been substituted with "fanned" cooling hole vectors illustrated by arrows 100, 102, 104, 106, 108, 110, 112 and 114 in FIGS. 4A, 4B and 5A. See for example, arrows 100 and 102 of FIG. 4A and/or arrows 104 and 106 of FIG. 4B to illustrate the transition between two electrode combs used in a given cooling row.

Figures 4A, 4B:
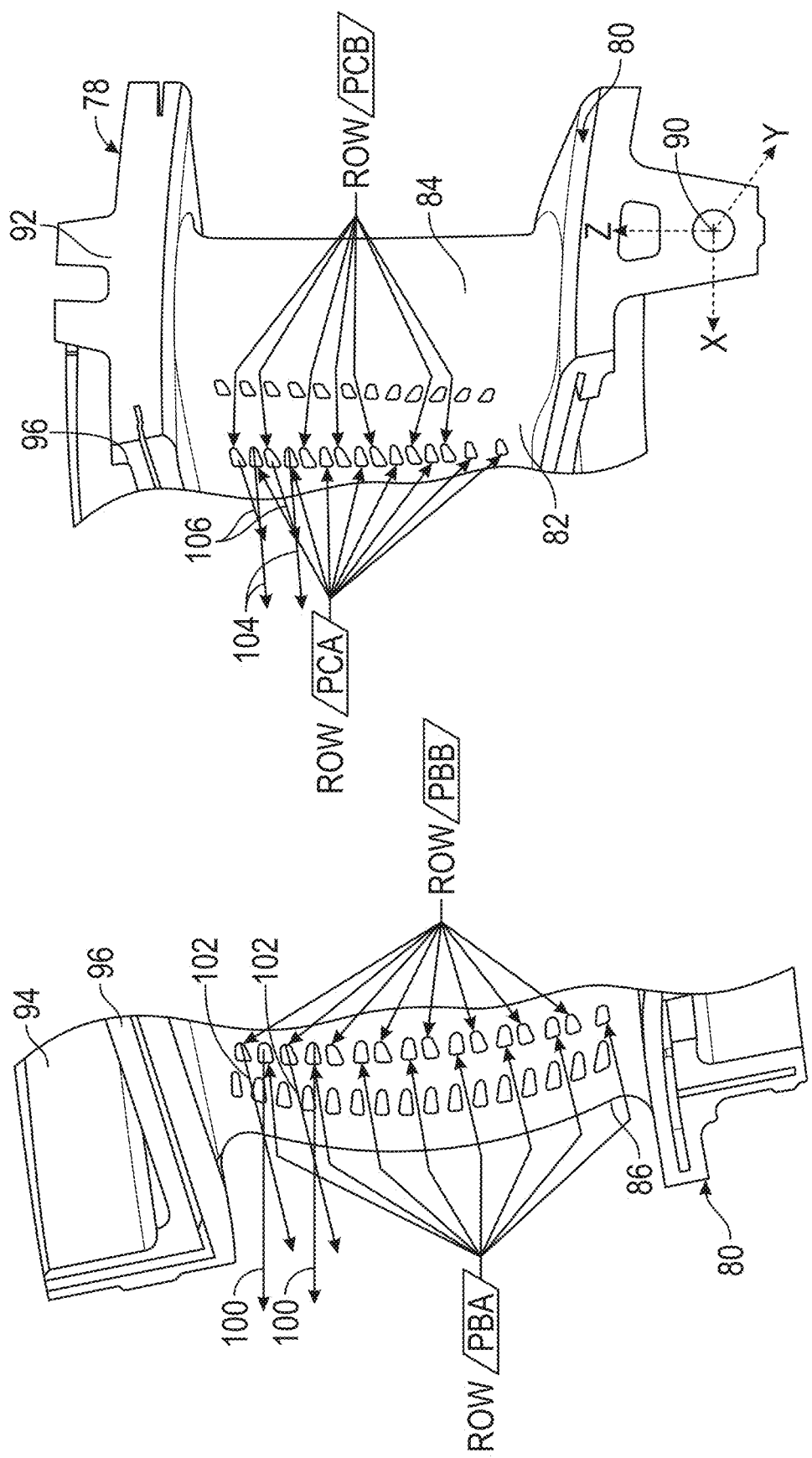
FIGS. 4A and 4B are perspective views of portions of the vane illustrated in FIG. 3.

For example, one comb electrode may be used to form the cooling holes depicted by row PBA in FIG. 4A while another comb electrode may be used to form the cooling holes depicted by row PBB in FIG. 4A. As illustrated, the cooling holes 88 of row PBA have a cooling hole vector depicted by arrows 100 and the cooling holes 88 of row PBB have a cooling hole vector depicted by arrows 102 each being associated with the configuration of the comb electrode used for these holes. Still further another single comb electrode may be used to form the cooling holes depicted by row PCA in FIG. 4B and another single comb electrode may be used to form the cooling holes depicted by row PCB in FIG. 4B. As illustrated, the cooling holes 88 of row PCA have a cooling hole vector depicted by arrows 104 and the cooling holes 88 of row PCB have a cooling hole vector depicted by arrows 106 each being associated with the configuration of the comb electrode used for these holes.

Figure 3:
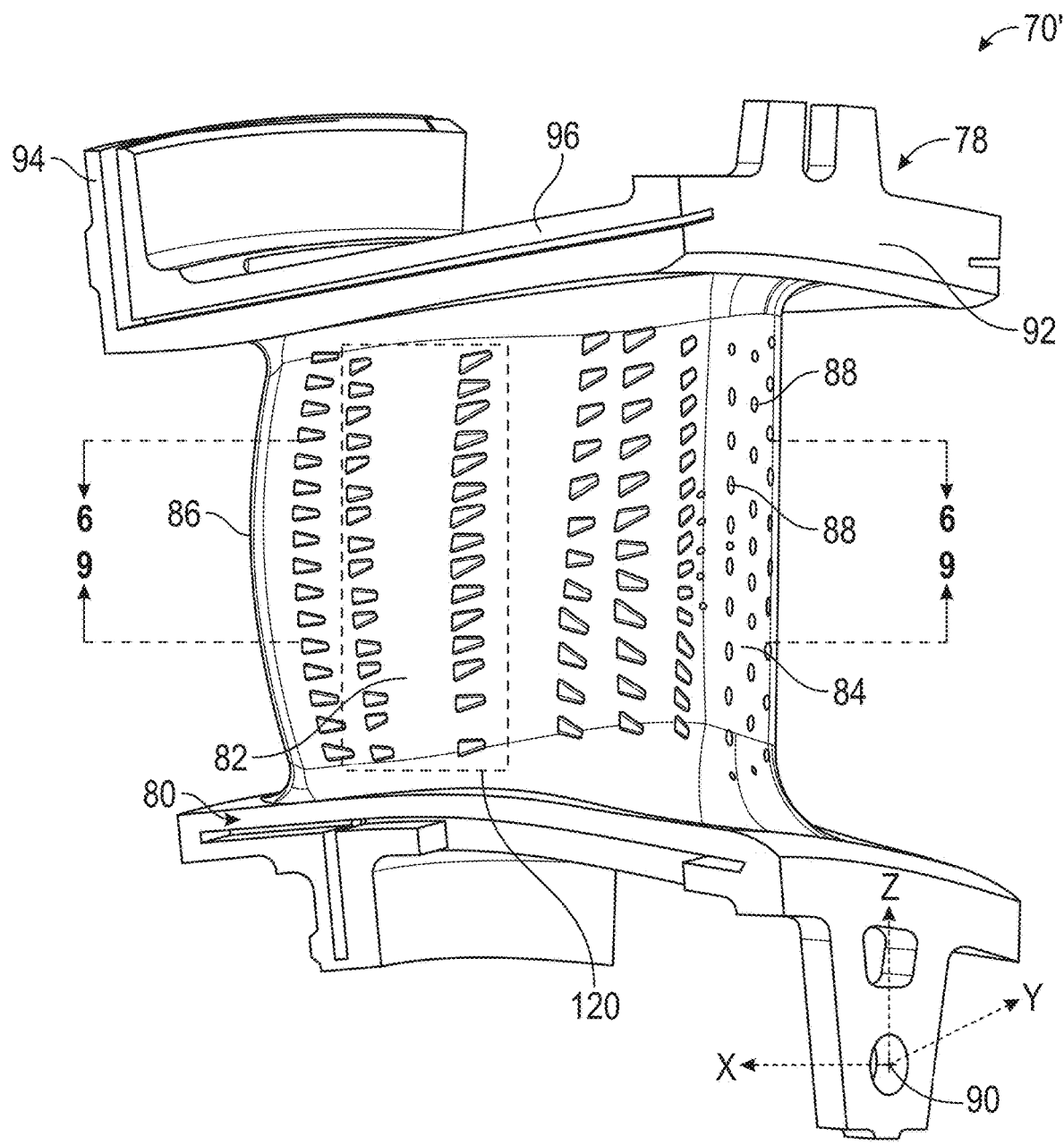
FIG. 3 is perspective view of a vane of the two-stage high pressure turbine of the gas turbine engine according to an embodiment of the present disclosure.

Box 120 in FIG. 3 illustrates an interlaced cooling hole pattern formed by at least two comb electrodes, one for one set of cooling holes with one set of vectors and the other for another set of cooling holes with another set of vectors. In one embodiment, different set of vectors alternate with each other to provide the interlaced cooling hole patterns shown in box 120 of FIG. 3.

Figure 5A:
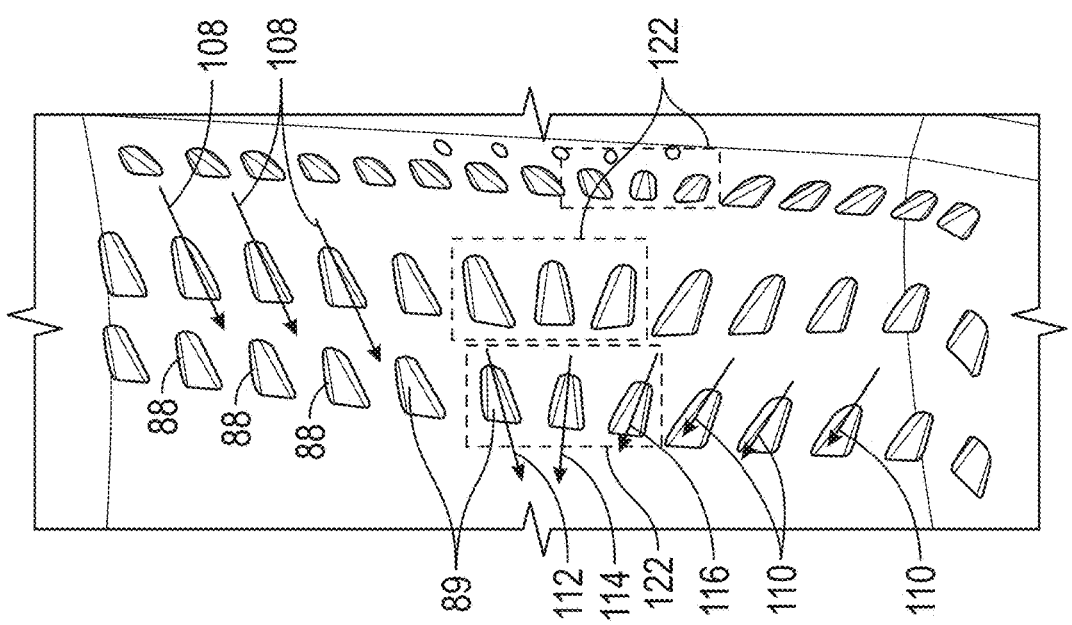
FIG. 5A is an enlarged view of a portion of the vane illustrated in FIG. 5.
Figure 5:
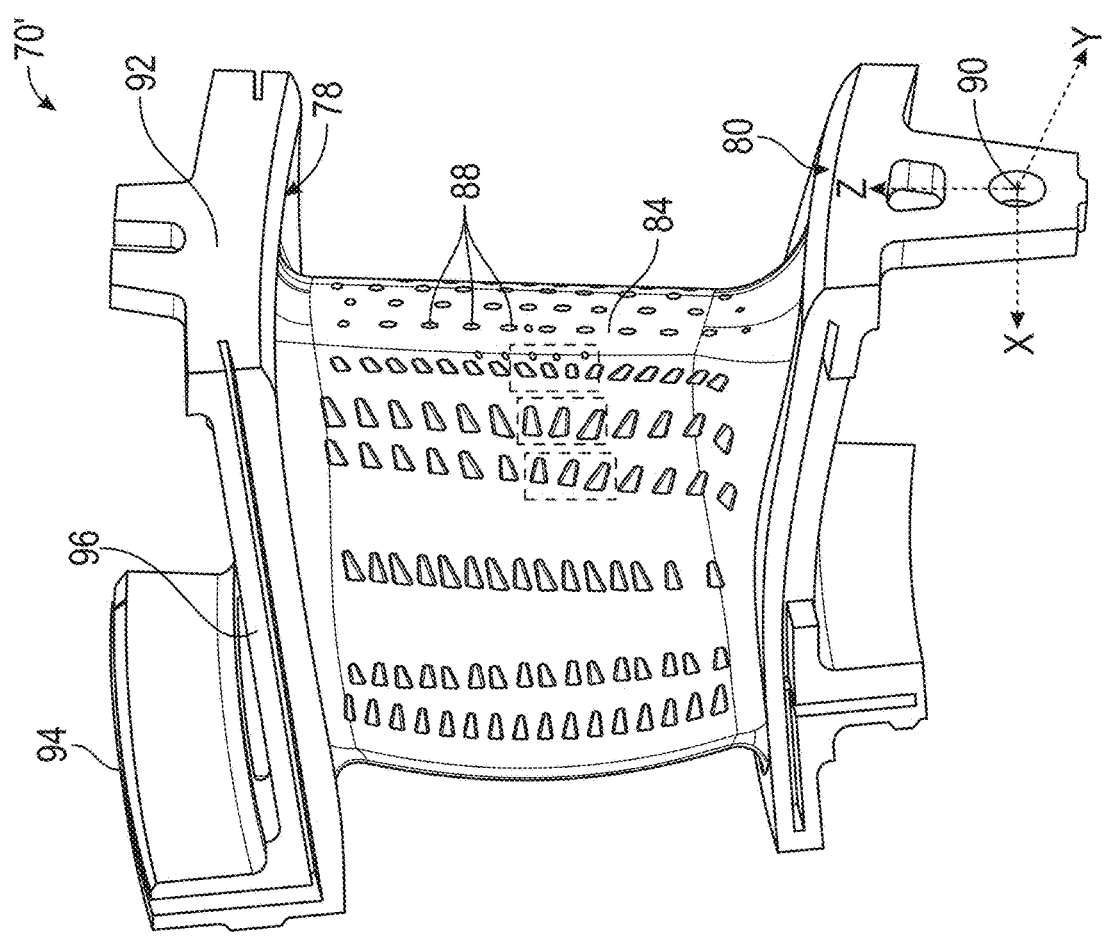
FIG. 5 is perspective view of a vane of the two-stage high pressure turbine of the gas turbine engine according to an embodiment of the present disclosure.

Boxes 122 in FIG. 5A illustrate three cooling holes each having a unique cooling hole vector (arrows 112, 114 and 116) formed by a single comb electrode while the cooling holes located above and below boxes 122 are each formed by a single comb electrode to provide cooling holes with cooling hole vectors represented by arrows 108 and 110.

In addition, each cooling hole external breakout points have been designed with consideration to the thermals on platform as well as other surfaces of the vane 70' such as but not limited to the airfoil 82. This not only results in favorable surface film-cooling but also utilizes conduction inside the cooling hole to reduce the temperature of the part.

In accordance with various embodiments of the present disclosure and as illustrated by the unique cooling hole patterns, optimal cooling effectiveness of the HPT 1st vane 70' while also overcoming prohibitive high EDM manufacturing costs. As mentioned above, the use of an EDM comb wherein multiple cooling holes can be drilled results in an improved drilling efficiency. As a result, the coating of the vane 70' is expected to be applied more evenly due to the cleaner cooling hole drill and less burrs. As such, these unique cooling hole configurations will enable EDM shaped holes to be utilized on the high pressure turbine vane airfoil and platforms.

Due to manufacturing tolerances, the external breakout of the centerline of the hole can fall within a 0.100 inch diameter circle inscribed on the surface of the part. However, the edge-to-edge spacing between edges of adjacent cooling holes of at least 0.010" should be maintained.

TABLE 1

| Hole # | Hole Name | External Breakout Center | | |
|---|---|---|---|---|
| | | X [in] | Y [in] | Z [in] |
| 1 | HAA | −2.570 | −0.667 | −0.836 |
| 2 | HAB | −2.540 | −0.683 | −0.714 |
| 3 | HAC | −2.538 | −0.684 | −0.577 |
| 4 | HAD | −2.537 | −0.684 | −0.434 |
| 5 | HAE | −2.536 | −0.684 | −0.292 |
| 6 | HAF | −2.536 | −0.684 | −0.164 |
| 7 | HAG | −2.536 | −0.684 | −0.099 |
| 8 | HAH | −2.536 | −0.684 | −0.033 |
| 9 | HAJ | −2.536 | −0.684 | 0.094 |
| 10 | HAK | −2.536 | −0.684 | 0.235 |
| 11 | HAL | −2.536 | −0.682 | 0.377 |
| 12 | HAM | −2.535 | −0.679 | 0.528 |
| 13 | HBA | −2.583 | −0.762 | −0.814 |
| 14 | HBB | −2.565 | −0.764 | −0.663 |
| 15 | HBC | −2.565 | −0.764 | −0.499 |
| 16 | HBD | −2.565 | −0.763 | −0.338 |
| 17 | HBE | −2.565 | −0.763 | −0.214 |
| 18 | HBF | −2.565 | −0.763 | −0.099 |
| 19 | HBG | −2.565 | −0.763 | 0.020 |
| 20 | HBH | −2.565 | −0.763 | 0.192 |
| 21 | HBJ | −2.565 | −0.764 | 0.352 |
| 22 | HBK | −2.565 | −0.762 | 0.508 |
| 23 | HCA | −2.569 | −0.843 | −0.765 |
| 24 | HCB | −2.565 | −0.846 | −0.592 |
| 25 | HCC | −2.565 | −0.849 | −0.430 |
| 26 | HCD | −2.565 | −0.849 | −0.287 |
| 27 | HCE | −2.563 | −0.855 | −0.165 |
| 28 | HCF | −2.563 | −0.857 | −0.020 |
| 29 | HCG | −2.565 | −0.849 | 0.124 |
| 30 | HCH | −2.565 | −0.845 | 0.260 |
| 31 | HCJ | −2.566 | −0.843 | 0.421 |
| 32 | HCK | −2.566 | −0.843 | 0.553 |
| 33 | HDA | −2.576 | −0.945 | −0.887 |
| 34 | HDB | −2.544 | −0.924 | −0.780 |
| 35 | HDC | −2.541 | −0.921 | −0.643 |
| 36 | HDD | −2.540 | −0.920 | −0.501 |
| 37 | HDE | −2.540 | −0.920 | −0.334 |
| 38 | HDF | −2.540 | −0.919 | −0.205 |
| 39 | HDG | −2.539 | −0.920 | −0.103 |
| 40 | HDH | −2.539 | −0.919 | 0.026 |
| 41 | HDJ | −2.540 | −0.920 | 0.168 |
| 42 | HDK | −2.538 | −0.923 | 0.310 |
| 43 | HDL | −2.535 | −0.930 | 0.451 |
| 44 | HDX | −2.540 | −0.921 | −0.414 |
| 45 | HEA | −2.611 | −0.597 | −0.925 |
| 46 | HEB | −2.647 | −0.711 | −0.931 |
| 47 | HEC | −2.650 | −0.846 | −0.938 |
| 48 | HED | −2.613 | −0.964 | −0.943 |
| 49 | HFA | −2.547 | −0.651 | 0.707 |
| 50 | HFB | −2.567 | −0.741 | 0.679 |
| 51 | HFC | −2.568 | −0.854 | 0.672 |
| 52 | HFD | −2.522 | −0.965 | 0.671 |
| 53 | HGA | −2.657 | −0.507 | −0.978 |
| 54 | HGB | −2.733 | −0.637 | −1.000 |
| 55 | HGC | −2.739 | −0.814 | −1.004 |
| 56 | HGD | −2.731 | −0.988 | −1.021 |

TABLE 1-continued

| Hole # | Hole Name | External Breakout Center X [in] | Y [in] | Z [in] |
|---|---|---|---|---|
| 57 | HGE | −2.723 | −1.161 | −1.036 |
| 58 | HHA | −2.690 | −0.679 | 0.771 |
| 59 | HHB | −2.693 | −0.855 | 0.767 |
| 60 | HHC | −2.687 | −1.015 | 0.757 |
| 61 | PAA | −1.752 | 0.278 | −0.784 |
| 62 | PAB | −1.745 | 0.314 | −0.700 |
| 63 | PAC | −1.739 | 0.346 | −0.616 |
| 64 | PAD | −1.734 | 0.373 | −0.532 |
| 65 | PAE | −1.731 | 0.394 | −0.448 |
| 66 | PAF | −1.729 | 0.411 | −0.363 |
| 67 | PAG | −1.727 | 0.425 | −0.279 |
| 68 | PAH | −1.726 | 0.434 | −0.195 |
| 69 | PAJ | −1.725 | 0.441 | −0.111 |
| 70 | PAK | −1.726 | 0.444 | −0.027 |
| 71 | PAL | −1.727 | 0.442 | 0.058 |
| 72 | PAM | −1.728 | 0.439 | 0.142 |
| 73 | PAN | −1.731 | 0.430 | 0.226 |
| 74 | PAP | −1.734 | 0.418 | 0.310 |
| 75 | PAR | −1.738 | 0.402 | 0.394 |
| 76 | PAS | −1.743 | 0.381 | 0.479 |
| 77 | PBA | −1.819 | 0.153 | −0.782 |
| 78 | PBA | −1.816 | 0.193 | −0.610 |
| 79 | PBA | −1.813 | 0.223 | −0.446 |
| 80 | PBA | −1.811 | 0.247 | −0.281 |
| 81 | PBA | −1.809 | 0.265 | −0.118 |
| 82 | PBA | −1.807 | 0.278 | 0.045 |
| 83 | PBA | −1.805 | 0.284 | 0.211 |
| 84 | PBA | −1.803 | 0.283 | 0.375 |
| 85 | PBB | −1.814 | 0.185 | −0.675 |
| 86 | PBB | −1.811 | 0.218 | −0.511 |
| 87 | PBB | −1.809 | 0.243 | −0.351 |
| 88 | PBB | −1.807 | 0.264 | −0.185 |
| 89 | PBB | −1.805 | 0.279 | −0.021 |
| 90 | PBB | −1.803 | 0.288 | 0.145 |
| 91 | PBB | −1.801 | 0.291 | 0.301 |
| 92 | PBB | −1.799 | 0.285 | 0.457 |
| 93 | PCA | −1.987 | −0.096 | −0.750 |
| 94 | PCA | −1.988 | −0.082 | −0.606 |
| 95 | PCA | −1.991 | −0.071 | −0.422 |
| 96 | PCA | −1.994 | −0.064 | −0.257 |
| 97 | PCA | −1.998 | −0.060 | −0.093 |
| 98 | PCA | −2.002 | −0.057 | 0.071 |
| 99 | PCA | −2.005 | −0.055 | 0.234 |
| 100 | PCA | −2.009 | −0.054 | 0.397 |
| 101 | PCB | −1.989 | −0.073 | −0.494 |
| 102 | PCB | −1.992 | −0.066 | −0.332 |
| 103 | PCB | −1.996 | −0.061 | −0.166 |
| 104 | PCB | −2.000 | −0.058 | 0.000 |
| 105 | PCB | −2.003 | −0.055 | 0.163 |
| 106 | PCB | −2.008 | −0.054 | 0.327 |
| 107 | PCB | −2.012 | −0.056 | 0.488 |
| 108 | PDA | −2.191 | −0.338 | −0.701 |
| 109 | PDA | −2.195 | −0.341 | −0.589 |
| 110 | PDA | −2.199 | −0.344 | −0.478 |
| 111 | PDA | −2.204 | −0.348 | −0.366 |
| 112 | PDB | −2.209 | −0.352 | −0.262 |
| 113 | PDC | −2.213 | −0.356 | −0.151 |
| 114 | PDD | −2.217 | −0.359 | −0.035 |
| 115 | PDE | −2.224 | −0.363 | 0.098 |
| 116 | PDE | −2.230 | −0.367 | 0.213 |
| 117 | PDE | −2.237 | −0.371 | 0.328 |
| 118 | PDE | −2.243 | −0.373 | 0.442 |
| 119 | PDE | −2.249 | −0.374 | 0.556 |
| 120 | PEA | −2.331 | −0.478 | −0.684 |
| 121 | PEA | −2.331 | −0.481 | −0.571 |
| 122 | PEA | −2.329 | −0.482 | −0.456 |
| 123 | PEA | −2.328 | −0.482 | −0.342 |
| 124 | PEB | −2.329 | −0.485 | −0.226 |
| 125 | PEC | −2.329 | −0.485 | −0.117 |
| 126 | PED | −2.330 | −0.485 | 0.001 |
| 127 | PEE | −2.329 | −0.483 | 0.113 |
| 128 | PEE | −2.333 | −0.485 | 0.228 |
| 129 | PEE | −2.337 | −0.486 | 0.343 |
| 130 | PEE | −2.340 | −0.485 | 0.458 |
| 131 | PEE | −2.342 | −0.482 | 0.571 |
| 132 | PFA | −2.445 | −0.576 | −0.688 |
| 133 | PFA | −2.445 | −0.581 | −0.603 |
| 134 | PFA | −2.445 | −0.584 | −0.517 |
| 135 | PFA | −2.446 | −0.587 | −0.430 |
| 136 | PFB | −2.444 | −0.588 | −0.334 |
| 137 | PFC | −2.443 | −0.589 | −0.251 |
| 138 | PFD | −2.442 | −0.589 | −0.169 |
| 139 | PFE | −2.442 | −0.590 | −0.084 |
| 140 | PFE | −2.442 | −0.590 | 0.004 |
| 141 | PFE | −2.443 | −0.590 | 0.092 |
| 142 | PFE | −2.443 | −0.590 | 0.179 |
| 143 | PFE | −2.444 | −0.590 | 0.266 |
| 144 | PFE | −2.444 | −0.589 | 0.353 |
| 145 | PFE | −2.444 | −0.587 | 0.439 |
| 146 | PFE | −2.445 | −0.585 | 0.545 |
| 147 | PGA | −2.479 | −0.617 | −0.294 |
| 148 | PGB | −2.471 | −0.611 | −0.197 |
| 149 | PGC | −2.471 | −0.612 | −0.118 |
| 150 | PGD | −2.470 | −0.612 | −0.026 |
| 151 | PGE | −2.470 | −0.611 | 0.064 |
| 152 | RAA | −2.755 | −1.527 | −1.089 |
| 153 | RAB | −2.745 | −1.358 | −1.063 |
| 154 | RAC | −2.617 | −1.396 | −1.038 |
| 155 | RAD | −2.605 | −1.189 | −1.012 |
| 156 | RAE | −2.468 | −1.256 | −0.987 |
| 157 | RAF | −2.484 | −1.127 | −0.970 |
| 158 | RAG | −2.321 | −1.119 | −0.927 |
| 159 | RBA | −1.935 | 0.095 | −0.898 |
| 160 | RBB | −1.844 | 0.186 | −0.899 |
| 161 | RCA | −1.998 | 0.121 | −0.903 |
| 162 | RCB | −1.905 | 0.207 | −0.912 |
| 163 | RCC | −1.807 | 0.278 | −0.915 |
| 164 | RDA | −1.553 | 0.303 | −0.922 |
| 165 | RDB | −1.548 | 0.481 | −0.946 |
| 166 | REA | −2.257 | −0.169 | −0.907 |
| 167 | REB | −2.262 | −0.065 | −0.914 |
| 168 | RFA | −2.374 | −0.264 | −0.927 |
| 169 | RFB | −2.393 | −0.172 | −0.938 |
| 170 | RGA | −2.485 | −0.358 | −0.943 |
| 171 | RGB | −2.520 | −0.281 | −0.962 |
| 172 | RHA | −1.958 | −0.856 | −0.874 |
| 173 | RHB | −1.878 | −0.762 | −0.877 |
| 174 | RHC | −1.792 | −0.656 | −0.874 |
| 175 | RJA | −1.549 | −0.226 | −0.878 |
| 176 | SAA | −2.443 | −1.033 | −0.783 |
| 177 | SAA | −2.443 | −1.029 | −0.704 |
| 178 | SAA | −2.443 | −1.025 | −0.625 |
| 179 | SAA | −2.444 | −1.022 | −0.545 |
| 180 | SAA | −2.444 | −1.020 | −0.465 |
| 181 | SAA | −2.444 | −1.018 | −0.384 |
| 182 | SAA | −2.445 | −1.017 | −0.303 |
| 183 | SAB | −2.448 | −1.013 | −0.215 |
| 184 | SAC | −2.444 | −1.015 | −0.136 |
| 185 | SAD | −2.449 | −1.012 | −0.057 |
| 186 | SAE | −2.443 | −1.016 | 0.042 |
| 187 | SAE | −2.443 | −1.016 | 0.137 |
| 188 | SAE | −2.444 | −1.017 | 0.233 |
| 189 | SAE | −2.444 | −1.018 | 0.328 |
| 190 | SAE | −2.445 | −1.019 | 0.422 |
| 191 | SAE | −2.445 | −1.022 | 0.515 |
| 192 | SBA | −2.319 | −1.070 | −0.804 |
| 193 | SBA | −2.320 | −1.068 | −0.725 |
| 194 | SBA | −2.320 | −1.065 | −0.645 |
| 195 | SBA | −2.320 | −1.063 | −0.565 |
| 196 | SBA | −2.321 | −1.061 | −0.485 |
| 197 | SBA | −2.321 | −1.060 | −0.405 |
| 198 | SBA | −2.321 | −1.058 | −0.324 |
| 199 | SBB | −2.324 | −1.057 | −0.231 |
| 200 | SBC | −2.319 | −1.056 | −0.140 |
| 201 | SBD | −2.334 | −1.054 | −0.042 |
| 202 | SBE | −2.334 | −1.054 | 0.044 |
| 203 | SBF | −2.337 | −1.054 | 0.138 |
| 204 | SBF | −2.338 | −1.054 | 0.217 |
| 205 | SBF | −2.339 | −1.055 | 0.296 |
| 206 | SBF | −2.340 | −1.056 | 0.375 |
| 207 | SBF | −2.341 | −1.057 | 0.454 |
| 208 | SBF | −2.341 | −1.058 | 0.532 |

TABLE 1-continued

| Hole # | Hole Name | External Breakout Center | | |
|---|---|---|---|---|
| | | X [in] | Y [in] | Z [in] |
| 209 | SCA | −2.113 | −0.970 | −0.641 |
| 210 | SCA | −2.112 | −0.970 | −0.557 |
| 211 | SCA | −2.111 | −0.970 | −0.473 |
| 212 | SCA | −2.110 | −0.970 | −0.389 |
| 213 | SCA | −2.109 | −0.970 | −0.305 |
| 214 | SCA | −2.109 | −0.969 | −0.221 |
| 215 | SCA | −2.108 | −0.969 | −0.137 |
| 216 | SCA | −2.109 | −0.969 | −0.053 |
| 217 | SCA | −2.110 | −0.968 | 0.031 |
| 218 | SCA | −2.111 | −0.968 | 0.115 |
| 219 | SCA | −2.112 | −0.968 | 0.199 |
| 220 | SCA | −2.114 | −0.967 | 0.283 |
| 221 | SCA | −2.117 | −0.967 | 0.367 |
| 222 | TAA | −1.784 | 0.516 | 0.562 |
| 223 | TAB | −1.833 | 0.396 | 0.585 |
| 224 | TBA | −1.974 | 0.368 | 0.613 |
| 225 | TBB | −2.005 | 0.207 | 0.634 |
| 226 | TCA | −2.283 | 0.107 | 0.690 |
| 227 | TCB | −2.287 | −0.021 | 0.700 |
| 228 | TCC | −2.290 | −0.168 | 0.708 |
| 229 | TDA | −2.471 | −0.059 | 0.735 |
| 230 | TDB | −2.470 | −0.226 | 0.742 |
| 231 | TDC | −2.470 | −0.376 | 0.746 |
| 232 | TFA | −2.686 | −0.210 | 0.766 |
| 233 | TFB | −2.686 | −0.361 | 0.770 |
| 234 | TFC | −2.685 | −0.518 | 0.771 |
| 235 | TGA | −2.688 | −1.157 | 0.748 |
| 236 | TGB | −2.684 | −1.363 | 0.728 |
| 237 | TGC | −2.684 | −1.576 | 0.704 |
| 238 | THA | −2.518 | −1.429 | 0.705 |
| 239 | THB | −2.395 | −1.307 | 0.696 |
| 240 | THC | −2.444 | −1.153 | 0.718 |
| 241 | TKA | −2.061 | −1.050 | 0.658 |
| 242 | TLA | −1.825 | −0.873 | 0.627 |
| 243 | TLB | −1.631 | −0.711 | 0.601 |
| 244 | TLC | −1.831 | −0.721 | 0.633 |
| 245 | TMA | −1.461 | −0.542 | 0.604 |
| 246 | TMB | −1.584 | −0.419 | 0.600 |
| 247 | TMC | −1.702 | −0.436 | 0.611 |
| 248 | TNA | −1.431 | −0.229 | 0.601 |
| 249 | TNB | −1.569 | −0.082 | 0.589 |
| 250 | TPA | −1.452 | 0.035 | 0.586 |
| 251 | TPB | −1.585 | 0.163 | 0.573 |
| 252 | TRA | −1.464 | 0.290 | 0.564 |
| 253 | TSA | −1.441 | 0.569 | 0.534 |
| 254 | TSB | −1.545 | 0.521 | 0.535 |
| 255 | TTA | −1.480 | 0.715 | 0.511 |
| 256 | TUA | −1.464 | −0.693 | 0.642 |
| 257 | TUB | −1.569 | −0.782 | 0.643 |
| 258 | TUC | −1.668 | −0.864 | 0.643 |
| 259 | TUD | −2.103 | −1.230 | 0.693 |
| 260 | TVA | −1.326 | 0.345 | 0.633 |
| 261 | TVB | −1.326 | 0.439 | 0.624 |
| 262 | TVC | −1.326 | 0.534 | 0.614 |
| 263 | TVD | −1.326 | 0.629 | 0.603 |
| 264 | TVE | −1.326 | 0.723 | 0.591 |
| 265 | TWA | −1.556 | 0.835 | 0.538 |
| 266 | TWB | −1.656 | 0.754 | 0.560 |
| 267 | TWC | −1.840 | 0.606 | 0.609 |
| 268 | TWD | −2.049 | 0.439 | 0.664 |
| 269 | TWE | −2.253 | 0.273 | 0.713 |
| 270 | TWF | −2.667 | −0.059 | 0.822 |

The x, y and z coordinate values in Table 1 are distances given in inches from the point of origin O on the vane 70', which is defined by reference numeral 90 in FIG. 3. In one embodiment, the point of origin O illustrated and identified by reference numeral 90 in FIGS. 4A, 4B and 5A, refers to a center of an opening that is formed in or cast into a portion of the vane 70' that extends below the lower platform or inner diameter platform 80. As used herein the opening identified by reference numeral 90 is below the lower platform or inner diameter platform 80. As such, this opening would be closer to the axis A than lower platform or inner diameter platform 80 when the vane 70' is secured to an outer housing or turbine case 84 of the engine 20. In other words, the lower platform 80 is at a further radial distance from the axis A than the center of the opening identified by reference numeral 90. In one embodiment, the center of the opening or origin designated by reference numeral 90 is formed in a portion of the vane 70' that extends from and below a leading edge of the lower platform or inner diameter platform 80. In other words, this portion is located below the leading edge 84 of the vane 70'.

It is, of course, understood that other units of dimensions may be used. The x, y and z values may in one embodiment have an average positional tolerance of +/−0.100 inches. In yet another embodiment the x, y and z values may have in average a manufacturing tolerance of about ±0.030". In still yet another embodiment the x, y and z values may have in average a manufacturing tolerance of about ±0.050". These tolerances may account for such things as casting, coating, ceramic coating and/or other tolerances. It is also understood that the manufacturing tolerances of the gas path may vary along the length thereof.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A turbine vane for a gas turbine engine, comprising:
   an inner platform;
   an outer platform;
   an airfoil extending between the inner platform and the outer platform; and
   a plurality of cooling holes defined in the turbine vane, the plurality of cooling holes provide fluid communication to a surface of the turbine vane, the plurality of cooling holes including holes defined by the following coordinates: TVA, TVB, TVC, TVD and TVE of Table 1, wherein for each hole, external breakout center corresponds to an intersection of a central axis of the cooling hole with an outer surface of the vane and wherein the X, Y, Z Cartesian coordinate values of Table 1 have a tolerance of ±0.100 inches of the nominal location with respect to the X, Y and Z axes.

2. The turbine vane of claim 1, wherein the turbine vane is a first stage turbine vane of a high pressure turbine of a gas turbine engine.

3. The turbine vane of claim 1, wherein the plurality of cooling holes include holes defined by the all of the coordinates of Table 1.

4. The turbine vane of claim 1, wherein the plurality of cooling holes include holes defined by the following coordinates of Table 1: TWA, TWB, TWC, TWD, TWE, TWF and TUA, TUB, TUC and TUD.

5. The turbine vane of claim 1, wherein the turbine vane is a first stage turbine vane of a high pressure turbine of a gas turbine engine.

6. The turbine vane of claim 5, wherein the plurality of cooling holes include holes defined by the following coordinates of Table 1: TWA, TWB, TWC, TWD, TWE, TWF and TUA, TUB, TUC and TUD.

7. The turbine vane of claim 1, wherein the plurality of cooling holes are formed by an electrical discharge machining process.

8. The turbine vane of claim 7, wherein the plurality of cooling holes include holes defined by the following coordinates of Table 1: TWA, TWB, TWC, TWD, TWE, TWF and TUA, TUB, TUC and TUD.

9. The turbine vane of claim 7, wherein the turbine vane is a first stage turbine vane of a high pressure turbine of a gas turbine engine.

10. The turbine vane of claim 9, wherein the plurality of cooling holes include holes defined by the all of the coordinates of Table 1.

11. The turbine vane of claim 7, wherein for each hole, external breakout center corresponds to an intersection of a central axis of the cooling hole with an outer surface of the vane.

12. A turbine vane for a gas turbine engine, comprising:
   an inner platform;
   an outer platform;
   an airfoil extending between the inner platform and the outer platform; and
   a plurality of cooling holes defined in the turbine vane, the plurality of cooling holes providing fluid communication to a surface of the turbine vane, the plurality of cooling holes including holes defined by the following coordinates: TWA, TWB, TWC, TWD, TWE, TWF and TUA, TUB, TUC and TUD of Table 1, wherein for each hole, external breakout center corresponds to an intersection of a central axis of the cooling hole with an outer surface of the vane and wherein the X, Y, Z Cartesian coordinate values of Table 1 have a tolerance of ±0.100 inches of the nominal location with respect to the X, Y and Z axes.

13. The turbine vane of claim 12, wherein the plurality of cooling holes are formed by an electrical discharge machining process.

14. The turbine vane of claim 13, wherein the turbine vane is a first stage turbine vane of a high pressure turbine of a gas turbine engine.

15. The turbine vane of claim 12, wherein the turbine vane is a first stage turbine vane of a high pressure turbine of a gas turbine engine.

16. A turbine stator assembly for a gas turbine engine comprising a plurality of vanes, each vane having:
   an inner platform;
   an outer platform;
   an airfoil extending between the inner platform and the outer platform; and
   a plurality of cooling holes defined in the turbine vane for providing fluid communication to a surface of each vane, the plurality of cooling holes including holes defined by the following coordinates: TVA, TVB, TVC, TVD and TVE of Table 1, wherein for each hole, external breakout center corresponds to an intersection of a central axis of the cooling hole with an outer surface of the vane and wherein the X, Y, Z Cartesian coordinate values of Table 1 have a tolerance of ±0.100 inches of the nominal location with respect to the X, Y and Z axes.

17. The turbine stator assembly of claim 16, wherein the plurality of cooling holes include holes defined by the all of the coordinates of Table 1.

18. A method of forming a cooling hole pattern in an exterior surface of a vane used in a high pressure turbine of a gas turbine engine, comprising:
   drilling a plurality of cooling holes in the exterior surface of the vane, wherein the plurality of cooling holes provide fluid communication to the exterior surface of the turbine vane, the plurality of cooling holes including holes defined by the following coordinates: TVA, TVB, TVC, TVD and TVE of Table 1, wherein for each hole, external breakout center corresponds to an intersection of a central axis of the cooling hole with an outer surface of the vane and wherein the X, Y, Z Cartesian coordinate values of Table 1 have a tolerance of ±0.100 inches of the nominal location with respect to the X, Y and Z axes.

* * * * *